Patented Oct. 2, 1951

2,569,470

UNITED STATES PATENT OFFICE 2,569,470

COMPOSITIONS COMPRISING ACRYLONITRILE AND HYDROLYZED POLYVINYL ACETATE

Hugh J. Hagemeyer, Jr., Elizabeth L. Oglesby, and John R. Caldwell, Kingsport, Tenn., assignors to Eastman Kodak Company, Rochester, N. Y., a corporation of New Jersey No Drawing. Application June 7, 1950, Serial No. 166,776

13 Claims. (Cl. 260—45.5)

This invention relates to composite, resinous compositions comprising acrylonitrile and partially hydrolyzed polyvinyl acetate.

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in certain instances due to a substantial lowering of the softening point of the fiber. For example, while an interpolymer of acrylonitrile and vinyl acetate containing about 80 per cent by weight of acrylonitrile and 20 per cent by weight of vinyl acetate in the polymer molecule, can be drawn into fibers readily susceptible to dyes, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 per cent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form these non-homogenous solutions or mixtures of polyacrylonitrile and polyvinyl acetate are too low in softening temperature to be of practical value, and also are subject to the defect of segmentation. This is not surprising because of the non-homogenous condition of the spinning solution and the fact that it is generally known that polyacrylonitrile is not compatible with many organic substances.

Whereas the mixtures of polyacrylonitrile and polyvinyl acetate mentioned above provide solutions which are heterogenous and separate into layers on standing (and from which fibers showing segmentation are obtained), and the interpolymers of acrylonitrile and vinyl acetate soften at too low temperatures to be of use in the preparation of fibers, we have found that certain composite resinous compositions comprising acrylonitrile and partially hydrolyzed polyvinyl acetate form stable solutions which do not separate into distinct layers on standing, and from which fibers readily susceptible to dyeing and of homogenous distribution can be spun. These fibers are characterized by softening points higher than the interpolymers of acrylonitrile mentioned above, and no not exhibit the segmentation defect shown by many of the fibers prepared from certain prior art mixtures comprising polyacrylonitrile.

It is, therefore, an object of our invention to provide composite, resinous compositions comprising acrylonitrile and partially hydrolyzed polyvinyl acetate.

Another object of our invention is to provide methods for making these compositions.

A further object of our invention is to provide homogenous solutions of these composite resinous compositions, and fibers prepared therefrom. Other objects will become apparent from a consideration of the following description and examples.

According to our invention we prepare our new compositions by polymerizing a mixture comprising from 60 to 85 per cent by weight of acrylonitrile and from 40 to 15 per cent by weight of partially hydrolyzed polyvinyl acetate.

It is known that small amounts of partially hydolyzed polyvinyl acetate can be used as granulating agents in the polymerization of acrylonitrile. (U. S. Patent 2,354,210, dated July 25, 1944, U. S. Patent 2,404,817, dated July 30, 1946, etc.) The partially hydrolyzed polyvinyl acetate used for this purpose is water soluble, or can be leached from the polymer products by washing. Moreover, the amounts of the hydrolyzed ester used are quite small, and have little effect on the dyeing properties of fibers prepared from these polymers.

Not less than 15 per cent of the polymerization mixtures of our invention comprise the partially hydrolyzed polyvinyl acetate, and the polyvinyl acetate ingredient is hydrolyzed to the extent that it contains not less than 20 per cent nor more than 50 per cent by weight of polyvinyl alcohol units. Hydrolyzed polyvinyl acetates containing less than 20 per cent by weight of polyvinyl alcohol units do not impart sufficient susceptibility to dyes in the polymer products, while those hydrolyzed esters containing more than 50 per cent by weight of polyvinyl alcohol are too water susceptible to be of value. Quantities smaller than 15 per cent of hydrolyzed polyvinyl acetate do not impart sufficient dye susceptibility, while amounts larger than 40 per cent cause a lowering of the softening point of fibers prepared from the polymer products.

While the hydrolyzed polyvinyl acetate used in the granular polymerization of acrylonitrile is removed in the processing of the polymer, this is not true of the hydrolyzed polyvinyl acetate used in our invention, which actually follows through into the polymer products to such an extent that fibers prepared therefrom can be readily dyed with acetate, direct, vat, etc. dyes. An inner equilibrium appears to be set up in the new polymer compositions of our invention, between the hydrolyzed polyvinyl acetate and the polymerized acrylonitrile, since the polymer compositions assume the character of a unary system, or a one component system. The polymer compositions of our invention act somewhat like solid solutions, since they are not affected by solvent extraction techniques and they cannot be mechanically broken down into their component parts. Spectrographic studies of our polymer compositions seem to indicate that in addition to polymerization of the acrylonitrile and some cyanoethylation of the hydrolyzed polyvinyl acetate, some imino-ether formation between the nitrile groups of the polyacrylonitrile and the hydroxyl groups of the hydrolyzed polyvinyl acetate takes place. Present studies have not yet revealed the theoretical basis for the phenomena exhibited by the polymer compositions of our invention. That the polymer compositions of our invention are not simple mixtures can be shown by dissolving the compositions in solvents known to have high dissolving power for polyacrylonitrile, such as N,N-dimethylformamide or N,N-dimethylacetamide. The solutions thus obtained are clear and homogeneous, whereas those solutions prepared by dissolving polyacrylonitrile in the solvent, followed by addition of the hydrolyzed polyvinyl acetate, are not clear, but are cloudy in appearance, which indicates the hydrolyzed polyvinyl acetate did not completely dissolve. Moreover, the solutions prepared from the polymer compositions of our invention do not separate into two layers on standing, while those prepared by adding polyacrylonitrile and hydrolyzed polyvinyl acetate separately to the solvent, e. g. N,N-dimethylacetamide, separate into distinct layers.

The polymer compositions of our invention can be prepared by polymerizing acrylonitrile in the presence of the hydrolyzed polyvinyl acetate. The polymerization can be accelerated with heat, and temperatures of from 40°–70° C. have been found to be especially useful, although higher or lower temperatures can be used, if desired.

The polymerization can be further accelerated by adding at least one of the catalysts known to accelerate the polymerization of vinyl compounds. Typical catalysts include the organic and inorganic peroxide polymerization catalysts, such as hydrogen peroxide, persulfates (e. g. the alkali metal persulfates, such as sodium, potassium, etc. persulfates, and ammonium persulfate), perborates (e. g. the alkali metal perborates, such as sodium, potassium, etc. perborates, and ammonium perborate), percarbonates (e. g. the alkali metal percarbonates, such as sodium, potassium, etc. percarbonates), ozone, peracetic acid, triacetone peroxide, urea peroxide, acetyl peroxide, benzoyl peroxide, acetyl benzoyl peroxide, lauroyl peroxide, oleoyl peroxide, etc. Other polymerization catalysts, such as triethyl phosphite, organic azines, etc. can also be used to increase the speed of polymerization. The quantity of catalyst used can be varied, however, we have found that from 0.01 per cent to 2 per cent by weight, based on the weight of acrylonitrile, can be used to advantage.

Advantageously, the polymerization can be effected with or without a diluent. Polymerization in an aqueous medium has been found to be especially useful, in that it is thus possible to use more conveniently many of the water-soluble polymerization catalysts, such as the persulfates. An organic solvent miscible with water can be added to the aqueous medium and the polymerization carried out in solution, or an emulsifying agent can be added to the aqueous medium, and the polymerization carried out in an emulsion.

For solution polymerization, an aqueous acetone solution can be used to give especially advantageous results, although other solvents, such as ethanol, n-propanol, isopropanol, etc. can be used. Aqueous acetone solutions containing from 30 to 70 per cent by volume of water and from 70 to 30 per cent by volume of acetone are representative of the solutions which can be used.

Typical emulsifying agents which we can use in emulsion polymerizations include the alkali metal salts of fatty alcohol sulfates (e. g. sodium lauryl sulfate, etc.), alkali metal salts of aromatic sulfonic acids (e. g. sodium isobutylnaphthalenesulfonate, etc.) sulfosuccinic acid esters, their alkali metal salts or amine addition salts, alkali metal salts of fatty acids containing from 12 to 20 carbon atoms, sulfonated fatty acid amides or their alkali metal salts, the complex reaction products obtained by reacting ethylene oxide with aliphatic alcohols and amines, polyvinyl alcohol polymers, etc.

It is sometimes advantageous to heat the acrylonitrile and hydrolyzed polyvinyl acetate together for a short time before adding the polymerization catalyst. This increases the amount of cyanoethylation, and increases the compatibility and homogeneity of the final products. After as much cyanoethylation has occurred as is possible, the polymerization catalyst can be added and heating continued until the polymerization is substantially complete.

Hydrolyzed polyvinyl acetates having a molecular weight within the range of 2,000 to 300,000 can be used, although weights of from 6,000 to 50,000 have been found to be especially useful. The composite polymer products formed in our invention having a molecular weight of from about 40,000 to 100,000 have been found to be especially useful as fiber precursors.

The pH of the polymerization medium can be varied from about 3 to 10, although a pH from 4 to 7 has given especially useful results. Acids, such as orthophosphoric acid, ethanesulphonic acid, oxalic acid, can be added to the polymerization medium, if desired. The air above the polymerization medium can be replaced with an inert gas, such as nitrogen, carbon dioxide, etc. prior to polymerization.

When the polymerization is nearly complete as evidenced by a drop in reaction heat, we have found that it is generally convenient to maintain the reaction temperature for an additional period of time to complete the polymerization. Any unreacted monomer is then distilled off under normal or reduced pressures. The reaction mixture contains from about 20 to 40 per cent solids, which are filtered off, or in the event the polymer products are obtained in the form of an emulsion, the emulsion is first broken by heating with a 1 to 2 per cent solution of sodium chloride, or aluminum sulfate, and the products then filtered off. After washing the polymers with water, they are dried in warm air at 60°–80° C. The drying can be accelerated by using a low boiling solvent in the final washing steps. The polymer products obtained in our invention having a molecular weight of from about 40,000 to 100,000 have been found to be of special utility.

The following examples will serve to illustrate more fully the manner whereby we practice our invention.

*Example 1*

20 g. of polyvinyl acetate which had been hydrolyzed to an acetyl content of 26.2 per cent (corresponding to 47.6 per cent polyvinyl alcohol) and 80 g. of acrylonitrile were mixed and added to a solution containing 350 cc. of water, 10 g. of dioctyl sodium sulfosuccinate and 1.0 g. of potassium persulfate. The mixture was then shaken until it had set to a stable emulsion, and the emulsion was heated to 55°–65° C. and maintained at this temperature by alternating heating and cooling for four hours. At the end of this time the resinous product was coagulated by heating with a one per cent sodium chloride solution. The reaction mixture was filtered, and the filter cake was washed first with distilled water and then acetone. After drying in warm air, there was obtained a yield of 83.0 g. of polymer having a nitrogen content of 19.76 per cent.

The dried resin was obtained as a white powder, and a 10 per cent solution of the powder was prepared using N,N-dimenthylformamide as a solvent. The viscous solution (or dope) was then spun into an isopropanol bath. The fibers obtained were drafted 1600% in hot air and then dried. This fiber was characterized by a tenacity of 3.78 grams per denier and 16 per cent elongation. It dyed well with acetate dyes.

*Example 2*

6.0 g. of polyvinyl acetate which had been hydrolyzed to a hydroxyl content of 14 percent (corresponding to 36 per cent polyvinyl alcohol) were dissolved in a solution containing 100 cc. of acetone and 15 cc. of water. There were then added to the solution 30 g. of acrylonitrile, 0.1 g. of potassium persulfate and 0.1 g. of dodecyl mercaptan. After adding an additional 90 cc. of water, the solution was agitated at 50° C. for 16 hours. The resinous product was coagulated by adding a solution of sodium sulfate, and the reaction mixture was filtered. The filter cake was then washed and dried. A yield of 32.0 g. of a resin containing 20 per cent by weight of hydrolyzed polyvinyl acetate was obtained.

A 10 per cent solution of the resin in N,N-dimethylacetamide was prepared, and the clear, smooth solution was spun into a precipitating bath. The fibers thus obtained had a softening point above 230° C., and they could be deeply dyed with cellulose acetate, direct, or vat dyes.

The hydrolyzed polyvinyl acetate used in the above example was prepared by hydrolyzing a polyvinyl acetate having a molecular weight of 15,000 in an alcohol-acetone solution containing hydrochloric acid.

*Example 3*

10.0 g. of polyvinyl acetate (molecular weight 20,000) which had been hydrolyzed to a product containing 45 per cent polyvinyl alcohol were dissolved in a solution of 50 cc. of water and 50 cc. of acetone. There were then added 30 g. of acrylonitrile, 0.1 g. of sodium persulfate and 55 cc. of acetone. The solution was then agitated at 60° C. for 12 hours. The resinous product was precipitated with acetone, washed and then dried in warm air. A yield of 35.0 g. of resin was obtained.

Solutions of the resinous product obtained in Example 3 in N,N-dimethylacetamide were clear and smooth in appearance. Fibers spun from these viscous solutions were dyed easily by vat, direct and cellulose acetate dyes.

*Example 4*

6.0 g. of polyvinyl acetate which had been hydrolyzed to a polyvinyl alcohol content of 33.1 per cent were dissolved in a solution containing 60 cc. of acetone and 20 cc. of methanol. There were then added 24 g. of acrylonitrile and 0.5 g. of benzoyl peroxide. The solution was then tumbled for thirty minutes and allowed to stand at 60° C. for 24 hours. The precipitated resin was washed with water and then dried. A yield of 19.0 g. of resin having a nitrogen content of 18.6 per cent was obtained.

The resinous product obtained in Example 4 gave clear, viscous solutions in N,N-dimethylformamide. These solutions were excellently suitable for spinning into fibers showing a high affinity for cellulose acetate, direct, and vat dyes.

*Example 5*

4.0 g. of polyvinyl acetate which had been hydrolyzed to a polyvinyl alcohol content of 33.1 per cent were dissolved in 60 cc. of acetone and 20 cc. of methanol. There were then added 24.0 g. of acrylonitrile and 0.5 g. of benzoyl peroxide. The solution was then tumbled for thirty minutes and allowed to stand at 60° C. for 24 hours. The precipitated resin was washed with water and then dried. A yield of 27.0 g. of resin containing 20.2 per cent nitrogen was obtained.

The resinous product obtained in Example 5 gave clear, viscous solutions in N,N-dimethylformamide, which were excellently suitable for spinning into fibers.

*Example 6*

6.0 g. of polyvinyl acetate which had been hydrolyzed to a polyvinyl alcohol content of 33.1 per cent were dissolved in a solution containing 60 cc. of acetone and 20 cc. of water. After all of the solid had been dissolved in the solution, there were added 24.0 g. of acrylonitrile and 0.3 g. of benzoyl peroxide. The solution was tumbled for thirty minutes and then allowed to stand at 60° C. for 24 hours. After washing and drying the precipitated resin, a yield of 22.0 g. of product was obtained.

Example 7

4.0 g. of polyvinyl acetate which had been hydrolyzed to a polyvinyl alcohol content of 33.1 per cent were dissolved in a solution containing 60 cc. of acetone and 20 cc. of water. After all of the solid had been dissolved, there were added 24.0 g. of acrylonitrile and 0.3 g. of benzoyl peroxide. The solution was then tumbled for thirty minutes and allowed to stand at 60° C. for 24 hours. After washing and drying the precipitated resin, a yield of 27.0 g. of product was obtained.

Any tendency for the yarns prepared from the products obtained in Examples 4 to 7 to stick to the drafting rollers was overcome by washing the precipitated resins with hot water prior to drying. Unreacted hydrolyzed polyvinyl acetate and acrylonitrile monomer is thus removed.

The hydrolyzed polyvinyl acetate useful in practicing our invention can be prepared by any of the mthods known to the art. For example, polyvinyl acetate can be hydrolyzed in an aqueous acetone solution in the presence of strong acids, such as hydrochloric, sulfuric, phosphoric, toluenesulfonic, etc. acids, or polyvinyl acetate can be subjected to alcoholysis using alkali metal hydroxides or alcoholates as catalysts. It is, of course, essential that the hydrolyzed polyvinyl acetate used in our invention contain from 20 to 50 per cent by weight of polyvinyl alcohol units in the polymer molecule.

In addition to N,N-dimethylformamide and N,N-dimethylacetamide, other solvents which have been found to be especially useful include ethylene carbamate, ethylene carbonate, N-methyl-2-pyrrolidone and γ-butyrolactone.

Other solvents which can be used in the preparation of solutions from our new compositions include N,N-dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N'-tetramethylmethane-phosphonamide, etc. Generally speaking, these solvents are not as advantageous as the solvents referred to above.

The resinous products of our invention are also useful in the preparation of sheets, films, tapes, etc.

What we claim as our invention and desire secured by Letters Patent of the United States is:

1. A process for preparing a composite polymer of acrylonitrile and a polyvinyl resin comprising heating in the presence of a peroxide polymerization catalyst a mixture comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units.

2. A process for preparing a composite polymer of acrylonitrile and a polyvinyl resin comprising heating in the presence of a peroxide polymerization catalyst a mixture comprising from 60 to 85 per cent by weight of acrylonitrile and from 40 to 15 per cent by weight of polyvinyl acetate hydrolyzed to the extent that from 20 to 30 per cent by weight of the molecule is composed of polyvinyl alcohol units.

3. A process for preparing a composite polymer of acrylonitrile and a polyvinyl resin comprising heating in the presence of an inorganic peroxide polymerization catalyst a mixture comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units.

4. A process for preparing a composite polymer of acrylonitrile and a polyvinyl resin comprising heating in the presence of an organic peroxide polymerization catalyst a mixture comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units.

5. A process for preparing a composite polymer of acrylonitrile and a polyvinyl resin comprising heating in the presence of a persulfate polymerization catalyst a mixture comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units.

6. A process for preparing a composite polymer of acrylonitrile and a polyvinyl resin comprising heating in the presence of a peroxide polymerization catalyst an aqueous emulsion comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units.

7. A process for preparing a composite polymer of acrylonitrile and a polyvinyl resin comprising heating in the presence of a peroxide polymerization catalyst an aqueous solution comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units.

8. A process for preparing a composite polymer of acrylonitrile and a polyvinyl resin comprising heating in the presence of a persulfate polymerization catalyst an aqueous emulsion comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units.

9. A process for preparing a composite polymer of acrylonitrile and a polyvinyl resin comprising heating in the presence of a persulfate polymerization catalyst an aqueous solution comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units.

10. A process for preparing a composite polymer of acrylonitrile and a polyvinyl resin comprising heating a mixture comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units, adding a peroxide polymerization catalyst, and continuing the heating until the mixture has polymerized completely.

11. A process for preparing a composite polymer of acrylonitrile and a polyvinyl resin comprising heating a mixture comprising from 60 to 85 per cent by weight of acrylonitrile and from 40 to 15 per cent by weight of polyvinyl acetate hydrolyzed to the extent that from 20 to 50 per cent by weight of the molecule is composed of polyvinyl alcohol units, adding a persulfate polymerization catalyst, and continuing the heating until the mixture has polymerized completely.

12. The polymer compositions obtained in claim 1.

13. The polymer compositions obtained in claim 11.

HUGH J. HAGEMEYER, JR.
ELIZABETH L. OGLESBY.
JOHN R. CALDWELL.

REFERENCES CITED

The following references are of record in the file of this patent:

UNITED STATES PATENTS

| Number | Name | Date |
|---|---|---|
| 2,341,553 | Houtz | Feb. 15, 1944 |